(12) United States Patent
Kitamoto

(10) Patent No.: US 11,605,828 B2
(45) Date of Patent: Mar. 14, 2023

(54) FUEL CELL SYSTEM

(71) Applicant: HONDA MOTOR CO., LTD., Tokyo (JP)

(72) Inventor: Ryota Kitamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/382,395

(22) Filed: Jul. 22, 2021

(65) Prior Publication Data

US 2022/0037684 A1    Feb. 3, 2022

(30) Foreign Application Priority Data

Jul. 29, 2020    (JP) .............................. JP2020-128100

(51) Int. Cl.
| | |
|---|---|
| *H01M 8/04* | (2016.01) |
| *H01M 8/04858* | (2016.01) |
| *H01M 8/04089* | (2016.01) |
| *H01M 8/04302* | (2016.01) |

(52) U.S. Cl.
CPC ... *H01M 8/04865* (2013.01); *H01M 8/04089* (2013.01); *H01M 8/04302* (2016.02); *H01M 2250/20* (2013.01)

(58) Field of Classification Search
CPC ...................... H01M 8/04089; H01M 8/04865
USPC ......................................................... 429/446
See application file for complete search history.

(56) References Cited

U.S. PATENT DOCUMENTS

| | | | | |
|---|---|---|---|---|
| 2010/0097031 A1* | 4/2010 | King | ....................... | B60L 53/11 320/109 |
| 2016/0105112 A1* | 4/2016 | Ukegawa | ............. | H02H 7/1213 323/271 |
| 2017/0062418 A1* | 3/2017 | Sugiura | ................. | H01L 25/072 |

(Continued)

FOREIGN PATENT DOCUMENTS

| | | |
|---|---|---|
| JP | 2009-224036 | 10/2009 |
| JP | 2017-228377 | 12/2017 |
| JP | 2019-122165 | 7/2019 |

(Continued)

OTHER PUBLICATIONS

Japanese Office Action for Japanese Patent Application No. 2020-128100 dated Feb. 8, 2022.

*Primary Examiner* — James M Erwin
(74) *Attorney, Agent, or Firm* — Amin, Turocy & Watson, LLP

(57) ABSTRACT

A fuel cell system that can improve an operating efficiency while minimizing an increase in cost for a configuration is provided. A fuel cell system (10) includes a fuel cell stack (11), an air pump (13), and an electric power control unit (15). The air pump (13) is connected to an output terminal of the fuel cell stack (11). The air pump (13) is configured to supply air as an oxidizing agent gas to the fuel cell stack (11). The electric power control unit (15) includes a first circuit unit (31) and a second circuit unit (32). The first circuit unit (31) is connected to the output terminal of the fuel cell stack (11) and is configured to perform step-up electric power conversion on an input from the fuel cell stack (11). The second circuit unit (32) is configured to perform bidirectional electric power conversion for stepping-up an input from the fuel cell stack (11) and for stepping-down an output to the air pump (13).

4 Claims, 4 Drawing Sheets

(56) References Cited

U.S. PATENT DOCUMENTS

2018/0123152 A1* 5/2018 Matsumoto ....... H01M 8/04223

FOREIGN PATENT DOCUMENTS

| WO | 2015/053037 | 4/2015 |
| WO | 2017/026059 | 2/2017 |

* cited by examiner

POWER IN THE BOOST DIRECTION

POWER IN THE BOOST DIRECTION

FUEL CELL SYSTEM

CROSS-REFERENCE TO RELATED APPLICATION

Priority is claimed on Japanese Patent Application No. 2020-128100, filed Jul. 29, 2020, the content of which is incorporated herein by reference.

BACKGROUND OF THE INVENTION

Field of the Invention

The present invention relates to a fuel cell system.

Description of Related Art

In the related art, for example, a fuel cell system that supplies electric power from a power storage device to an air pump when a fuel cell starts is known (for example, refer to Patent Document 1 (Japanese Unexamined Patent Application, First Publication No. 2017-228377) and Patent Document 2 (Japanese Unexamined Patent Application, First Publication No. 2009-224036)).

SUMMARY OF THE INVENTION

Incidentally, in the above fuel cell system in the related art, it is desired to cope with a higher load output of a drive motor that receives supply of electric power by providing an electric power conversion circuit that controls an output voltage of a fuel cell, secure accurate start of the fuel cell while minimizing complication of the configuration, and improve electric power efficiency when the fuel cell is operated. However, when a supply path of electric power required for starting and continuing an operation of an air pump through which an oxidizing agent gas is supplied to the fuel cell is unsuitable, there are problems that the costs incurred for the configuration increases and the operating efficiency cannot be improved.

An object of the present invention is to provide a fuel cell system that can improve an operating efficiency while minimizing an increase in cost for a configuration.

A fuel cell system according to the invention has the following configuration.

(1) A fuel cell system according to an aspect of the present invention includes a fuel cell stack; an oxidizing agent gas supply device that is configured to supply an oxidizing agent gas to the fuel cell stack; and an electric power control device including a first circuit unit that is connected to an output terminal of the fuel cell stack and is configured to perform step-up electric power conversion on an input from the fuel cell stack, and a second circuit unit that is configured to perform bidirectional electric power conversion for stepping-up an input from the fuel cell stack and for stepping-down an output to the oxidizing agent gas supply device.

(2) In the fuel cell system according to the above aspect (1), the electric power control device may include an input unit to which electric power is input for the stepped-up electric power conversion, an input/output unit in which electric power is output for the stepped-up electric power conversion and electric power is input for the stepped-down electric power conversion, and an output unit in which electric power is output for the stepped-down electric power conversion, the first circuit unit may include a first switching element and a first freewheel diode connected to a negative electrode terminal of the input/output unit, a diode connected in a forward direction from the first switching element to a positive electrode terminal of the input/output unit between the first switching element and the positive electrode terminal of the input/output unit, and a first reactor that is connected between the first switching element, the diode, and a positive electrode terminal of the input unit, and the second circuit unit may include a second switching element and a second freewheel diode connected to the negative electrode terminal of the input/output unit, a third switching element and a third freewheel diode connected to the positive electrode terminal of the input/output unit, and a second reactor connected between the second switching element, the third switching element, and the positive electrode terminal of the input unit.

(3) In the fuel cell system according to the above aspect (2), the electric power control device may include a second diode connected in a forward direction from the positive electrode terminal of the input unit to a positive electrode terminal of the output unit between the positive electrode terminal of the input unit and the positive electrode terminal of the output unit.

(4) In the fuel cell system according to the above aspect (2) or (3), the third switching element may be provided according to an amount of electric power required for the step-down.

According to the aspect (1), when the first circuit unit and the second circuit unit are provided, a part (that is, the second circuit unit) of the electric power control device, which performs step-up electric power conversion on an input from the fuel cell stack, performs step-down electric power conversion on an output to an oxidizing agent gas supply device directly connected to the output terminal of the fuel cell stack. Therefore, when the fuel cell system starts, the oxidizing agent gas supply device can be activated with electric power obtained by step-down electric power conversion performed by a part of the electric power control device, and accurate activation can be performed while minimizing an increase in cost required for the configuration of the device. After the fuel cell system starts, driving of the oxidizing agent gas supply device with the electric power obtained from power generation of the fuel cell stack can be continued, and for example, compared to when electric power of the power storage device is always supplied to the oxidizing agent gas supply device, it is possible to improve the operating efficiency of the fuel cell system.

According to the aspect (2), the difference between the first circuit unit and the second circuit unit is in whether the switching element (corresponding to the third switching element of the second circuit unit) connected to the positive electrode terminal of the input/output unit is provided, and thus step-up/step-down bidirectional electric power conversion can be performed by a part (that is, the second circuit unit) of the electric power control device while minimizing an increase in cost required for the configuration of the device.

According to the aspect (3), when the second diode is provided, it is possible to prevent a current from flowing from the output unit to the fuel cell stack via the input unit.

According to the aspect (4), it is possible to prevent the configuration of the electric power control device from becoming excessively complicated and minimize an increase in cost required for the configuration.

DETAILED DESCRIPTION OF THE INVENTION

Hereinafter, a vehicle 1 including a fuel cell system 10 according to an embodiment of the present invention will be described with reference to the appended drawings.

Figure 1:
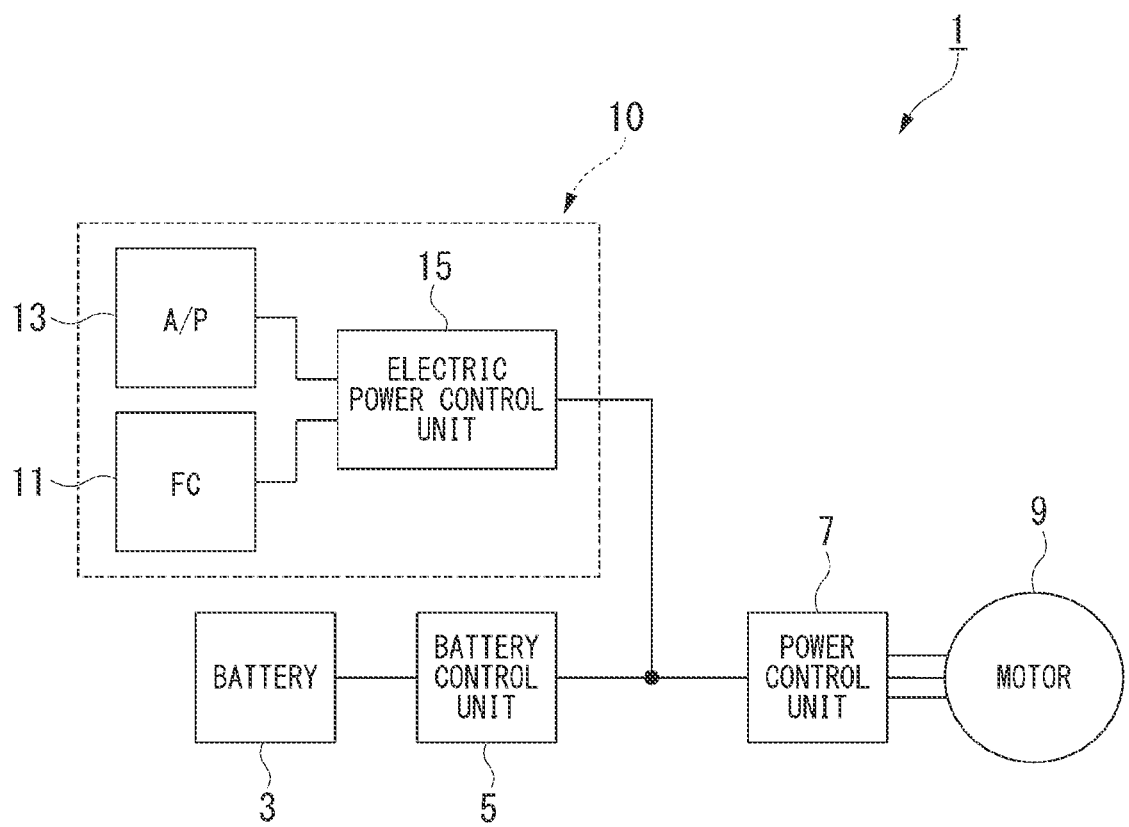
FIG. 1 is a diagram schematically showing a configuration of a vehicle in which a fuel cell system according to an embodiment of the present invention is mounted.
Figure 2:
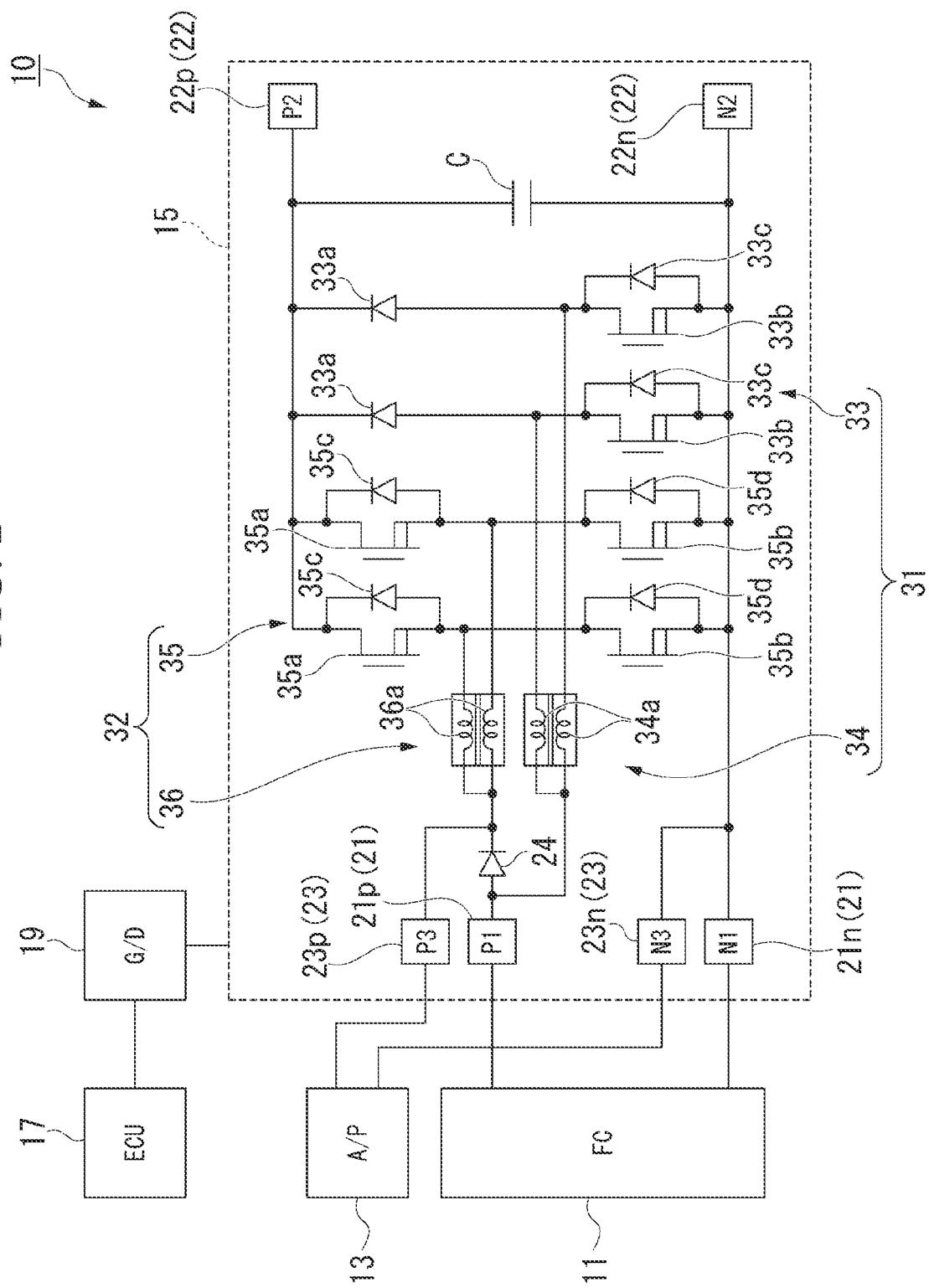
FIG. 2 is a diagram showing a configuration of the fuel cell system according to the embodiment of the present invention.

FIG. 1 is a diagram schematically showing a configuration of the vehicle 1 in which the fuel cell system 10 according to the embodiment is mounted. FIG. 2 is a diagram showing a configuration of the fuel cell system 10 according to the embodiment.

The fuel cell system 10 of the embodiment is mounted in, for example, the vehicle 1 such as a fuel cell vehicle using a fuel cell as a power source.

The vehicle 1 includes, for example, a battery 3, a battery control unit 5, a power control unit 7, and a motor 9 for driving running.

The battery 3 is, for example, a high-voltage battery which is a power source for the vehicle 1. The battery 3 includes a battery case and a plurality of battery modules accommodated in the battery case. The battery modules include a plurality of battery cells connected in series.

The battery control unit 5 is, for example, an electric power conversion device including a DC-DC converter that performs step-up/step-down bidirectional electric power conversion.

The power control unit 7 is, for example, an electric power conversion device including an inverter that performs electric power conversion between a direct current and an alternating current. The power control unit 7 controls, for example, power running and regeneration of the motor 9. When the motor 9 is powered, the power control unit 7 converts DC electric power input from the battery control unit 5 or the fuel cell system 10 into 3-phase AC electric power and supplies it to the motor 9, and generates rotation driving power. When the motor 9 is regenerated, the power control unit 7 can convert 3-phase AC electric power input from the motor 9 into DC electric power and supply it to the battery 3, and can charge the battery 3.

The fuel cell system 10 includes a fuel cell stack (FC) 11, an air pump (A/P) 13, an electric power control unit 15, an electronic control unit (ECU) 17 and a gate drive unit (G/D) 19.

The fuel cell stack (FC) 11 is, for example, a polymer electrolyte fuel cell. For example, the polymer electrolyte fuel cell includes a plurality of laminated fuel cells and a pair of end plates with a laminate of a plurality of fuel cells interposed therebetween. The fuel cell includes an electrolyte electrode structure and a pair of separators with an electrolyte electrode structure interposed therebetween. The electrolyte electrode structure includes a solid polymer electrolyte membrane, and a fuel electrode and an oxygen electrode with the solid polymer electrolyte membrane interposed therebetween. The solid polymer electrolyte membrane includes a cation-exchange membrane and the like. The fuel electrode (anode) includes an anode catalyst, a gas diffusion layer, and the like. The oxygen electrode (cathode) includes a cathode catalyst, a gas diffusion layer, and the like.

The fuel cell stack 11 generates power according to a catalytic reaction between a fuel gas supplied from a fuel tank (not shown) to an anode and an oxidizing agent gas such as oxygen-containing air supplied from the air pump 13 to a cathode.

An output terminal of the fuel cell stack 11 is connected to an input unit 21 of the electric power control unit 15.

The air pump 13 supplies air as an oxidizing agent gas to a cathode of the fuel cell stack 11. The air pump 13 is connected to an output unit 23 of the electric power control unit 15. The air pump 13 is driven with electric power supplied from the battery 3 connected via the electric power control unit 15 when power generation of the fuel cell stack 11 is stopped such as when the fuel cell system 10 starts.

The air pump 13 is connected to the output terminal of the fuel cell stack 11. The air pump 13 is driven with electric power supplied from the fuel cell stack 11 when the fuel cell stack 11 generates power such as when the fuel cell system 10 operates.

The electric power control unit 15 is an electric power conversion device including a DC-DC converter that performs step-up/step-down bidirectional electric power conversion. The electric power control unit 15 includes the input unit 21 connected to the output terminal of the fuel cell stack 11, an input/output unit 22 connected to the battery control unit 5 and the power control unit 7, and the output unit 23 connected to the air pump 13. The input unit 21 includes a positive electrode terminal (P1) 21*p* and a negative electrode terminal (N1) 21*n*. The input/output unit 22 includes a positive electrode terminal (P2) 22*p* and a negative electrode terminal (N2) 22*n*. The output unit 23 includes a positive electrode terminal (P3) 23*p* and a negative electrode terminal (N3) 23*n*.

For example, the electric power control unit 15 includes a diode 24 connected from the positive electrode terminal (P1) 21*p* to the positive electrode terminal (P3) 23*p* in a forward direction between the positive electrode terminal (P1) 21*p* of the input unit 21 and the positive electrode terminal (P3) 23*p* of the output unit 23. For example, the negative electrode terminal (N1) 21*n* of the input unit 21, the negative electrode terminal (N2) 22*n* of the input/output unit 22, and the negative electrode terminal (N3) 23*n* of the output unit 23 are connected to each other via a common busbar or the like.

The electric power control unit 15 includes a first circuit unit 31 that performs step-up electric power conversion, a second circuit unit 32 that performs step-up/step-down bidirectional electric power conversion, and a smoothing capacitor C.

The first circuit unit 31 includes, for example, a first bridge circuit 33 and a first composite reactor 34.

The first bridge circuit 33 includes, for example, a plurality of switching elements and rectifying elements that are bridge-connected in two phases. For example, the switching element is a transistor such as a metal oxide semi-conductor field effect transistor (MOSFET). The rectifying element is, for example, a diode. Each phase of the first bridge circuit 33 includes, for example, a diode 33a of a high-side arm, and a transistor 33b and a freewheel diode 33c of a low-side arm.

The cathode of the diode 33a of the high-side arm is connected to the positive electrode terminal (P2) 22p of the input/output unit 22. An emitter of the transistor 33b of the low-side arm is connected to the negative electrode terminal (N2) 22n of the input/output unit 22. An anode of the diode 33a of the high-side arm and a collector of the transistor 33b of the low-side arm are connected. The freewheel diode 33c of the low-side arm is connected from the emitter to the collector in a forward direction between the collector and the emitter of the transistor 33b.

The first composite reactor 34 includes, for example, 2-phase coils 34a magnetically coupled to each other with reverse polarities. A first end of the coil 34a in each phase is connected to the positive electrode terminal (P1) 21p of the input unit 21. A second end of the coil 34a in each phase is connected to the anode of the diode 33a of the high-side arm and the collector of the transistor 33b of the low-side arm in each phase of the first bridge circuit 33.

The first circuit unit 31 switches on (connects)/off (disconnects) each transistor 33b based on a gate signal which is a switching command input from the gate drive unit 19 to a gate of the transistor 33b in each phase. The first circuit unit 31 steps-up electric power input from the input unit 21 due to power generation of the fuel cell stack 11 and outputs the stepped-up electric power from the input/output unit 22. The first circuit unit 31 accumulates magnetic energy according to DC excitation of the first composite reactor 34 when each transistor 33b is turned on (connected). The first circuit unit 31 generates a voltage higher than that of the input unit 21 in the input/output unit 22 by superposing an induced voltage generated by magnetic energy of the first composite reactor 34 when each transistor 33b is turned off (disconnected) and a voltage applied to the input unit 21.

The second circuit unit 32 includes, for example, a second bridge circuit 35 and a second composite reactor 36.

The second bridge circuit 35 includes, for example, a plurality of switching elements and rectifying elements that are bridge-connected in two phases. For example, the switching element is a transistor such as a metal oxide semi-conductor field effect transistor (MOSFET). The rectifying element is, for example, a diode. Each phase of the second bridge circuit 35 includes, for example, a pair of high-side arm and low-side arm transistors 35a and 35b and freewheel diodes 35c and 35d.

A collector of the transistor 35a of the high-side arm is connected to the positive electrode terminal (P2) 22p of the input/output unit 22. An emitter of the transistor 35b of the low-side arm is connected to the negative electrode terminal (N2) 22n of the input/output unit 22. An emitter of the transistor 35a of the high-side arm is connected to a collector of the transistor 33b of the low-side arm. The freewheel diodes 35c and 35d of the high-side arm and the low-side arm are connected from the emitter to the collector in a forward direction between the collector and the emitter of each of the transistors 35a and 35b.

The second composite reactor 36 includes, for example, 2-phase coils 36a magnetically coupled to each other with reverse polarities. A first end of the coil 36a in each phase is connected to the positive electrode terminal (P3) 23p of the output unit 23. A second end of the coil 36a in each phase is connected to the anode of the transistor 35a of the high-side arm and the collector of the transistor 35b of the low-side arm in each phase of the second bridge circuit 35.

For example, the configuration of the second circuit unit 32 corresponds to a configuration obtained by adding a switching element of a high-side arm to the configuration of the first circuit unit 31.

The second circuit unit 32 switches on (connects)/off (disconnects) the transistors 35a and 35b based on a gate signal which is a switching command input from the gate drive unit 19 to a gate of each of the transistors 35a and 35b in each phase.

As in the first circuit unit 31, during step-up, the second circuit unit 32 steps-up electric power input from the input unit 21 due to power generation of the fuel cell stack 11 and outputs the stepped-up electric power from the input/output unit 22. The second circuit unit 32 accumulates magnetic energy according to DC excitation of the second composite reactor 36 when each transistor 35a of the high-side arm is turned off (disconnected) and each transistor 35b of the low-side arm is turned on (connected). The second circuit unit 32 generates a voltage higher than that of the input unit 21 in the input/output unit 22 by superposing an induced voltage generated by magnetic energy of the second composite reactor 36 when each transistor 35a of the high-side arm is turned on (connected) and each transistor 33b of the low-side arm is turned off (disconnected) and a voltage applied to the input unit 21.

During step-down, the second circuit unit 32 steps-down electric power input from the input/output unit 22 and outputs the stepped-down electric power from the output unit 23 to the air pump 13. The second circuit unit 32 accumulates magnetic energy according to DC excitation of the second composite reactor 36 when each transistor 35a of the high-side arm is turned on (connected) and each transistor 33b of the low-side arm is turned off (disconnected). The second circuit unit 32 generates a voltage lower than that of the input/output unit 22 in the output unit 23 by stepping-down of an induced voltage generated by magnetic energy of the second composite reactor 36 when each transistor 35a of the high-side arm is turned off (disconnected) and each transistor 35b of the low-side arm is turned on (connected).

The electronic control unit 17 controls operations of the fuel cell system 10. For example, the electronic control unit 17 is a software functional unit that functions by executing a predetermined program by a processor such as a central processing unit (CPU). The software functional unit is an electronic control unit (ECU) including a processor such as a CPU, a read only memory (ROM) in which programs are stored, a random access memory (RAM) in which data is temporarily stored, and an electronic circuit such as a timer. Here, at least a part of the electronic control unit 17 may be an integrated circuit such as a large scale integration (LSI).

For example, the electronic control unit 17 generates a control signal input to the gate drive unit 19 when the fuel cell system 10 starts and when power generation is continued. The control signal is a signal indicating a timing at which each switching element of the electric power control unit 15 is driven to be turned on (connected)/off (disconnected).

For example, the electronic control unit 17 drives each switching element of the bridge circuits 33 and 35 by so-called 2-phase interleaves for each of the first circuit unit 31 and the second circuit unit 32 of the electric power control unit 15. During step-up and during step-down, the electronic control unit 17 shifts one cycle of switching control of a first phase switching element between two phases of each of the bridge circuits 33 and 35 and one cycle of switching control of a second phase switching element between two phases shifted from each other by half of a cycle.

The gate drive unit 19 generates a gate signal for actually driving each switching element of the electric power control unit 15 on (connected)/off (disconnected) based on a control signal received from the electronic control unit 17. For example, the gate drive unit 19 generates a gate signal by performing amplification of a control signal, level shifting and the like. For example, the gate drive unit 19 generates a gate signal having a duty ratio according to a step-up voltage command when the electric power control unit 15 is stepped-up or a step-down voltage command when the electric power control unit 15 is stepped-down. The duty ratio is, for example, the ratio of an on time of each switching element.

The electronic control unit 17 activates the air pump 13 when the fuel cell system 10 starts and performs step-down electric power conversion of the electric power control unit 15 when supply of air from the air pump 13 to the cathode of the fuel cell stack 11 starts. The electric power control unit 15 steps-down electric power input to the input/output unit 22 and outputs the stepped-down electric power from the output unit 23 to the air pump 13. The electric power input to the input/output unit 22 is, for example, electric power output from the battery 3 via the battery control unit 5 or electric power output from the power control unit 7 due to regeneration of the motor 9.

When power generation of the fuel cell stack 11 is continued after the fuel cell system 10 starts, the electronic control unit 17 performs step-up electric power conversion of the electric power control unit 15. The electric power control unit 15 steps-up electric power input from the fuel cell stack 11 to the input unit 21 and outputs the stepped-up electric power from the input/output unit 22. In this case, the electric power required for driving the air pump 13 is directly supplied from the fuel cell stack 11. The electric power output from the input/output unit 22 of the electric power control unit 15 is supplied to the battery 3 via the battery control unit 5 or supplied to the motor 9 via the power control unit 7.

As described above, the fuel cell system 10 of the embodiment includes the second circuit unit 32 that performs step-down electric power conversion on an output to the air pump 13 connected to the output terminal of the fuel cell stack 11 in addition to step-up for an input from the fuel cell stack 11. Accordingly, when the fuel cell system 10 starts, the air pump 13 can be activated with electric power obtained by step-down electric power conversion performed by a part (that is, the second circuit unit 32) of the electric power control unit 15, and accurate activation can be performed while minimizing an increase in cost required for the configuration of the device. After the fuel cell system 10 starts, driving of the air pump 13 with the electric power obtained from power generation of the fuel cell stack 11 can be continued, and for example, compared to when electric power of the battery 3 is always supplied to the air pump 13, it is possible to improve an operating efficiency of the fuel cell system 10.

The difference between the first circuit unit 31 and the second circuit unit 32 of the electric power control unit 15 is whether the switching element of the high-side arm (corresponding to the transistor 35a of the second circuit unit 32) is provided, and thus step-up/step-down bidirectional electric power conversion can be performed by a part (that is, the second circuit unit 32) of the electric power control unit 15 while minimizing an increase in cost required for the configuration of the device. The electric power control unit 15 includes the diode 24 connected in a forward direction from the positive electrode terminal 21p of the input unit 21 to the positive electrode terminal 23p of the output unit 23 between the positive electrode terminal 21p of the input unit 21 and the positive electrode terminal 23p of the output unit 23, and thus can prevent a current from flowing from the output unit 23 to the fuel cell stack 11 via the input unit 21.

Modified Examples

Hereinafter, modified examples of the embodiment will be described. Here, the same components as in the above embodiment will be denoted with the same reference numerals and descriptions thereof will be omitted or simplified.

In the above embodiment, each of the first circuit unit 31 and the second circuit unit 32 includes 2-phase bridge circuits (the first bridge circuit 33 and the second bridge circuit 35), but the present invention is not limited thereto. The electric power control unit 15 may include a multi-phase bridge circuit as a whole of the first circuit unit 31 and the second circuit unit 32.

In the above embodiment, the electric power control unit 15 includes the first composite reactor 34 in which 2-phase coils 34a are integrated and the second composite reactor 36 in which 2-phase coils 36a are integrated, but the present invention is not limited thereto. For example, the electric power control unit 15 may include a plurality of reactors (for example, two or four reactors) independent (that is, not integrated with other phases) for each phase in place of at least any of the first composite reactor 34 and the second composite reactor 36.

In the above embodiment, the number of phases of the first circuit unit 31 that performs step-up electric power conversion and the number of phases of the second circuit unit 32 that performs step-up/step-down bidirectional electric power conversion are each two phases, but the present invention is not limited thereto.

The number of phases of the first circuit unit 31 that performs step-up electric power conversion and the number of phases of the second circuit unit 32 that performs step-up/step-down bidirectional electric power conversion each may be an appropriate number of phases that is at least one or more phases.

For example, a combination of the number of phases of the first circuit unit 31 that performs step-up electric power conversion and the number of phases of the second circuit unit 32 that performs step-up/step-down bidirectional electric power conversion may be set according to the amount of electric power required for a step-down operation of the electric power control unit 15.

Figure 3:
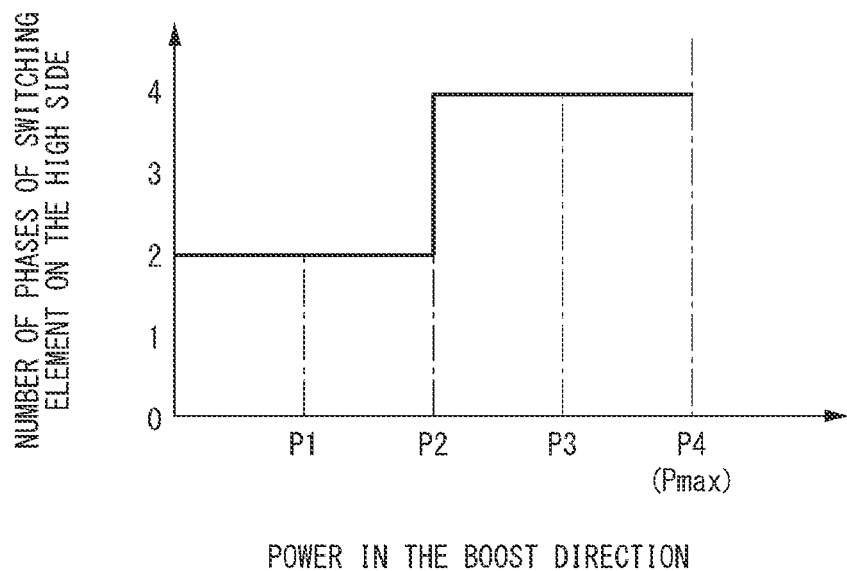
FIG. 3 is a diagram showing an example of a correspondence relationship between electric power in a step-down direction of an electric power control unit of a fuel cell system according to a modified example of the embodiment of the present invention and the number of phases of a switching element on the high side.

FIG. 3 is a diagram showing an example of a correspondence relationship between electric power in a step-down direction of the electric power control unit 15 of the fuel cell system 10 of the modified example of the embodiment and the number of phases of the switching element on the high side.

In an example shown in FIG. 3, the number of phases of the electric power control unit 15 (that is, a total number of phases including the number of phases of the first circuit unit 31 and the number of phases of the second circuit unit 32) is four phases, and the maximum amount of electric power Pmax in the step-up direction of the electric power control unit 15 is a predetermined amount of electric power P4. The number of phases of the switching element on the high side, that is, the number of phases of the second circuit unit 32 that performs step-up/step-down bidirectional electric power conversion, is two phases when the amount of electric power required in the step-down direction is ½ of the maximum amount of electric power Pmax (P2=Pmax/2) or less, and is four phases when the amount of electric power required in the step-down direction is larger than ½ of the maximum amount of electric power Pmax (P2=Pmax/2) and the maximum amount of electric power Pmax or less.

Figure 4:
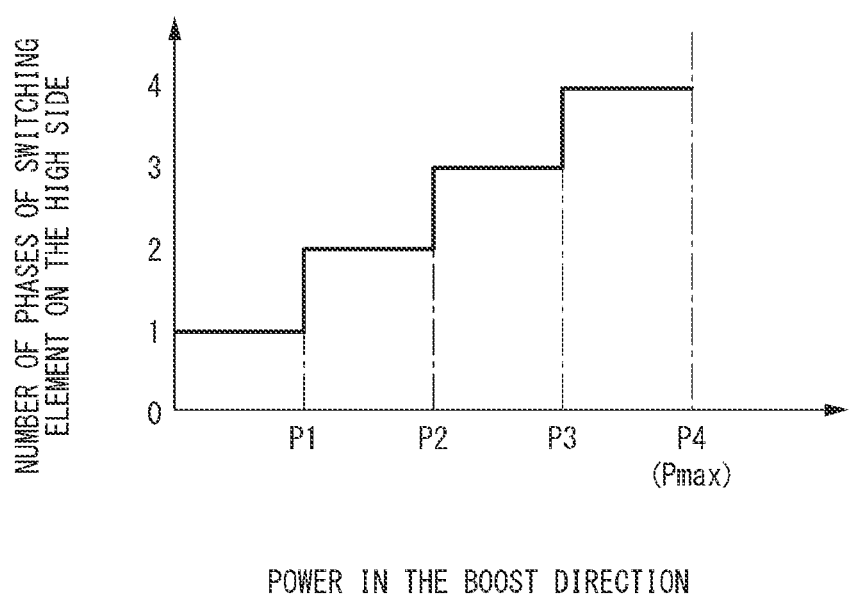
FIG. 4 is a diagram showing another example of the correspondence relationship between electric power in a step-down direction of an electric power control unit of a fuel cell system according to a modified example of the embodiment of the present invention and the number of phases of a switching element on the high side.

FIG. 4 is a diagram showing another example of the correspondence relationship between electric power in a step-down direction of the electric power control unit 15 of the fuel cell system 10 according to a modified example of the embodiment and the number of phases of the switching element on the high side.

In an example shown in FIG. 4, the number of phases of the electric power control unit 15 (that is, a total number of phases including the number of phases of the first circuit unit 31 and the number of phases of the second circuit unit 32) is four phases, and the maximum amount of electric power Pmax in a step-up direction of the electric power control unit 15 is a predetermined amount of electric power P4. The number of phases of the switching element on the high side, that is, the number of phases of the second circuit unit 32 that performs step-up/step-down bidirectional electric power conversion, is one phase when the amount of electric power required in the step-down direction is ¼ of the maximum amount of electric power Pmax (P1=Pmax/4) or less. The number of phases of the switching element on the high side is two phases when the amount of electric power required in the step-down direction is larger than ¼ of the maximum amount of electric power Pmax (P1=Pmax/4) and ½ of the maximum amount of electric power Pmax (P2=Pmax/2) or less. The number of phases of the second circuit unit 32 is three phases when the amount of electric power required in the step-down direction is larger than ½ of the maximum amount of electric power Pmax (P2=Pmax/2) and ¾ of the maximum amount of electric power Pmax (P3=Pmax·¾) or less. The number of phases of the second circuit unit 32 is one phase when the amount of electric power required in the step-down direction is larger than ¾ of the maximum amount of electric power Pmax (P3=Pmax·¾) and the maximum amount of electric power Pmax or less.

Figure 5:
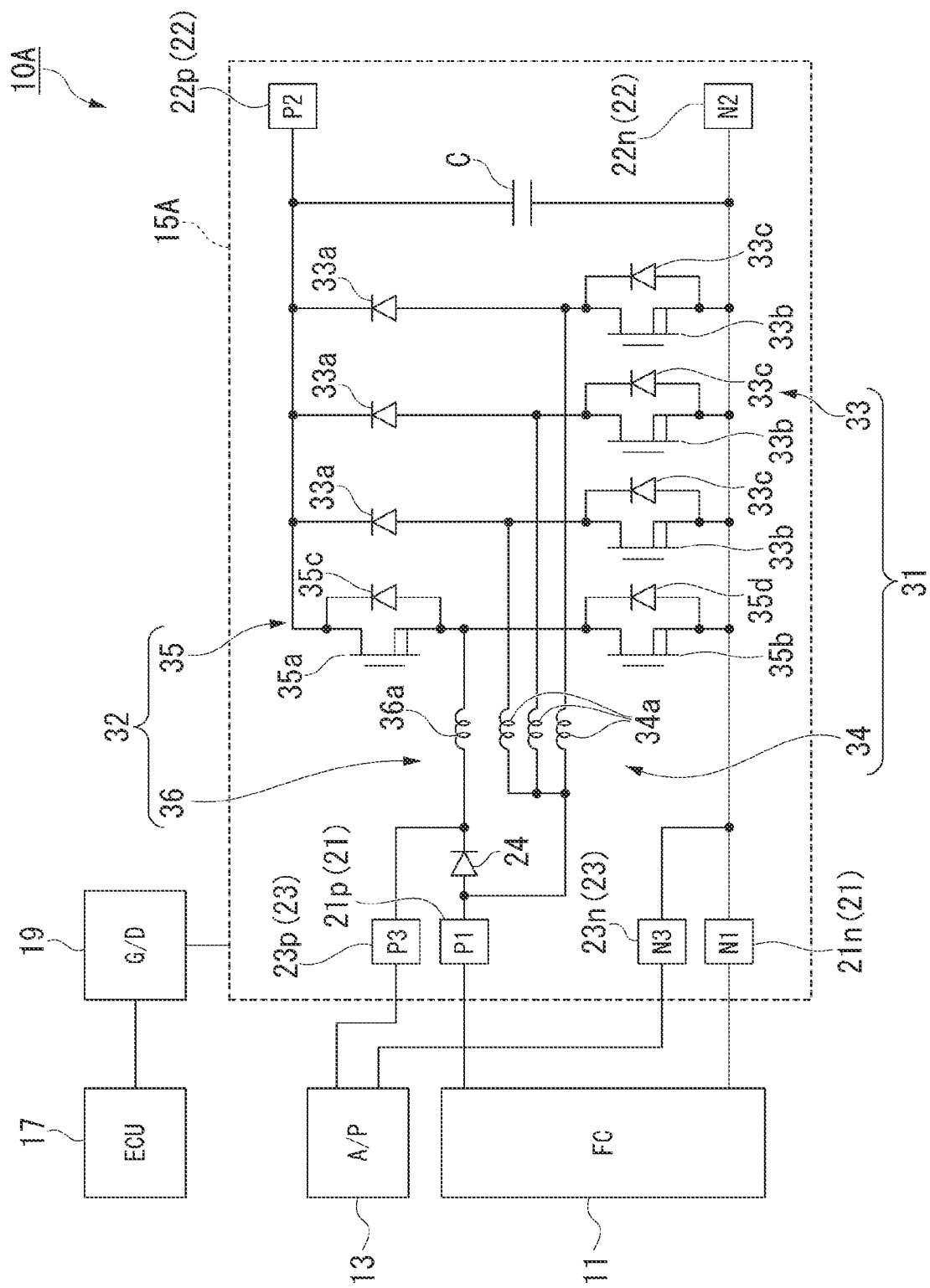
FIG. 5 is a diagram showing a configuration of the fuel cell system according to the modified example of the embodiment of the present invention.

FIG. 5 is a diagram showing a configuration of a fuel cell system 10A according to a modified example of the embodiment.

The fuel cell system 10A according to the modified example shown in FIG. 5 corresponds to a case in which the amount of electric power required in the step-down direction in the example shown in FIG. 4 is ¼ of the maximum amount of electric power Pmax (P1=Pmax/4) or less.

The fuel cell system 10A according to the modified example includes an electric power control unit 15A in place of the electric power control unit 15 of the fuel cell system 10 of the above embodiment. The electric power control unit 15A according to the modified example includes a 3-phase first circuit unit 31 and a 1-phase second circuit unit 32.

The 3-phase first circuit unit 31 includes three diodes 33a of the high-side arm, three transistors 33b and the freewheel diode 33c of the low-side arm, and three coils 34a.

The 1-phase second circuit unit 32 includes one each of a transistor 35a and a freewheel diode 35c of the high-side arm and one each of a transistor 35b and a freewheel diode 35d of the low-side arm.

An example in which the fuel cell system is mounted in the fuel cell vehicle in which electric power generated in the fuel cell is used as electric power for driving or electric power for operating in-vehicle units has been described in the above embodiment, and the present invention is not limited thereto. The system may be mounted in automobiles with two wheels, three wheels, four wheels, or the like and other mobile units (for example, ships, flying vehicles, and robots), and may be mounted in stationary or portable fuel cell systems.

The embodiments of the present invention are only examples, and are not intended to limit the scope of the invention. These embodiments can be implemented in various other forms, and various omissions, substitutions, and changes can be made without departing from the spirit and scope of the invention. These embodiments and modifications thereof are included in the spirit and scope of the invention and fall within the inventions described in the appended claims and equivalents thereof.

EXPLANATION OF REFERENCES

1 Vehicle
10, 10A Fuel cell system
11 Fuel cell stack
13 Air pump (oxidizing agent gas supply device)
15, 15A Electric power control unit (electric power control device)
21 Input unit
22 Input/output unit
23 Output unit
24 Diode (second diode)
31 First circuit unit
32 Second circuit unit
33 First bridge circuit
33a Diode
33b Transistor (first switching element)
33c Freewheel diode (first freewheel diode)
34 First composite reactor (first reactor)
34a Coil (first reactor)
35 Second bridge circuit
35a Transistor (third switching element)
35b Transistor (second switching element)
35c Diode (third freewheel diode)
35d Diode (second freewheel diode)
36 Second composite reactor (second reactor)

What is claimed is:

1. A fuel cell system, comprising
a fuel cell stack;
an oxidizing agent gas supply device that is configured to supply an oxidizing agent gas to the fuel cell stack; and
an electric power control device including a first circuit unit that is connected to an output terminal of the fuel cell stack and is configured to perform step-up electric power conversion on an input from the fuel cell stack, and a second circuit unit that is configured to perform bidirectional electric power conversion for stepping-up an input from the fuel cell stack and for stepping-down an output to the oxidizing agent gas supply device,
wherein the electric power control device comprises an input unit to which electric power is input for the stepped-up electric power conversion, an input/output unit in which electric power is output for the stepped-up electric power conversion and electric power is input for the stepped-down electric power conversion, and an output unit in which electric power is output for the stepped-down electric power conversion,
wherein the first circuit unit comprises a first switching element and a first freewheel diode connected to a negative electrode terminal of the input/output unit, a diode connected in a forward direction from the first switching element to a positive electrode terminal of the input/output unit between the first switching element and the positive electrode terminal of the input/output unit, and a first reactor that is connected between the first switching element, the diode, and a positive electrode terminal of the input unit, and wherein the second circuit unit comprises a second switching element and a second freewheel diode connected to the negative electrode terminal of the input/output unit, a third switching element and a third freewheel diode connected to the positive electrode terminal of the input/output unit, and a second reactor connected between the second switching element, the third switching element, and the positive electrode terminal of the input unit.

2. The fuel cell system according to claim 1, wherein the electric power control device comprises a second diode connected in a forward direction from the positive electrode terminal of the input unit to a positive electrode terminal of the output unit between the positive electrode terminal of the input unit and the positive electrode terminal of the output unit.

3. The fuel cell system according to claim 1, wherein the third switching element is provided according to an amount of electric power required for the step-down.

4. The fuel cell system according to claim 2, wherein the third switching element is provided according to an amount of electric power required for the step-down.

* * * * *